Sept. 30, 1969  J. T. ZELLERS, JR  3,469,964
CUT-OFF VENTING MEANS FOR SHEET GLASS PROCESS
Original Filed Sept. 17, 1962  8 Sheets-Sheet 1

INVENTOR.
James T. Zellers, Jr.

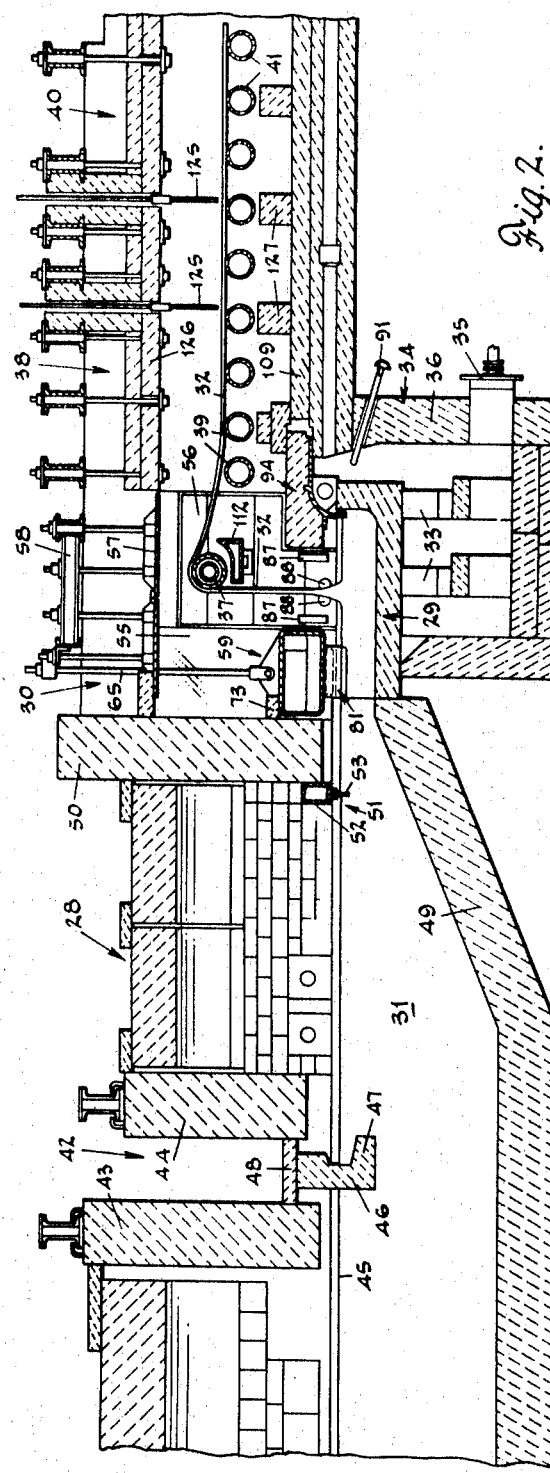

INVENTOR.
James T. Zellers, Jr.

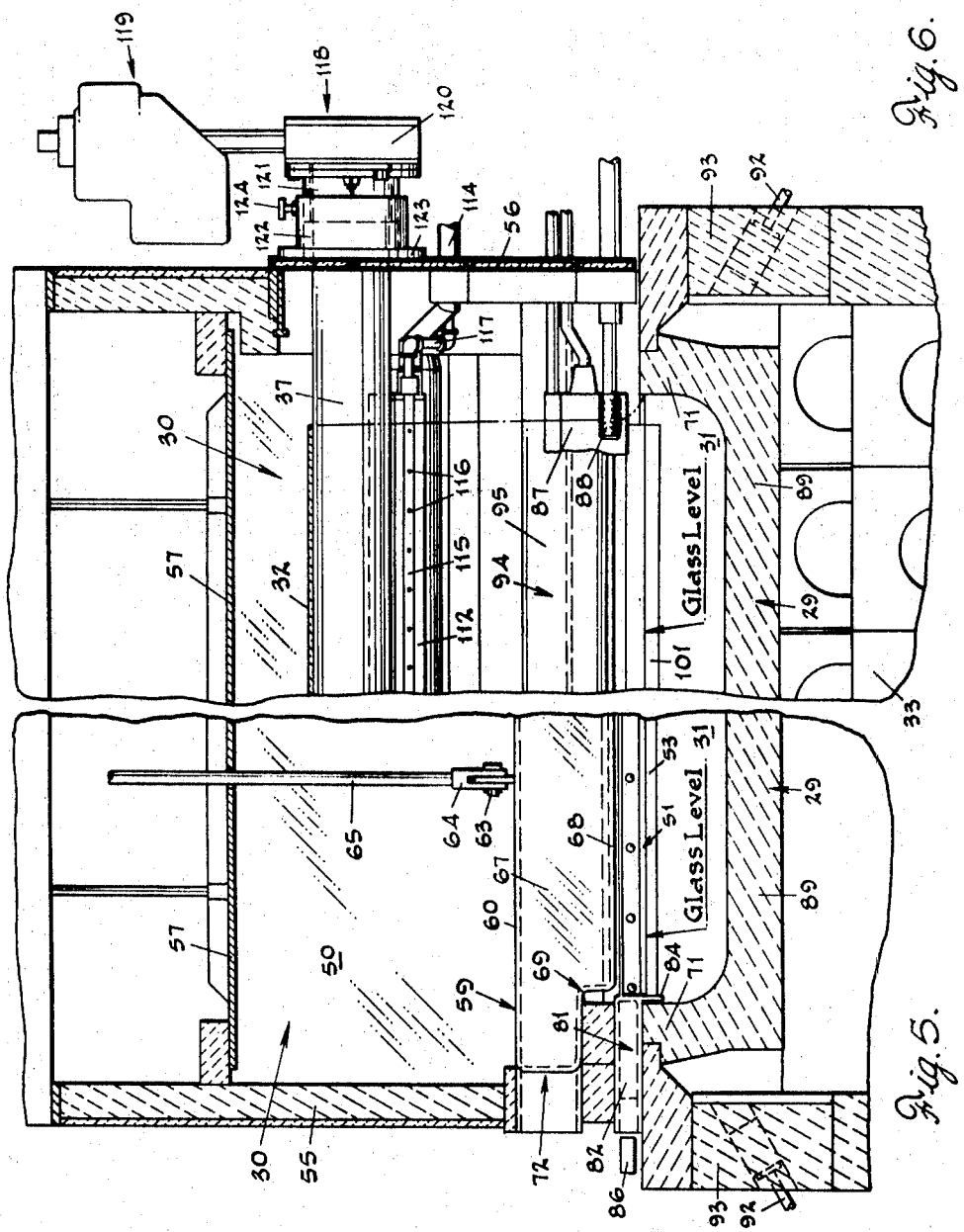

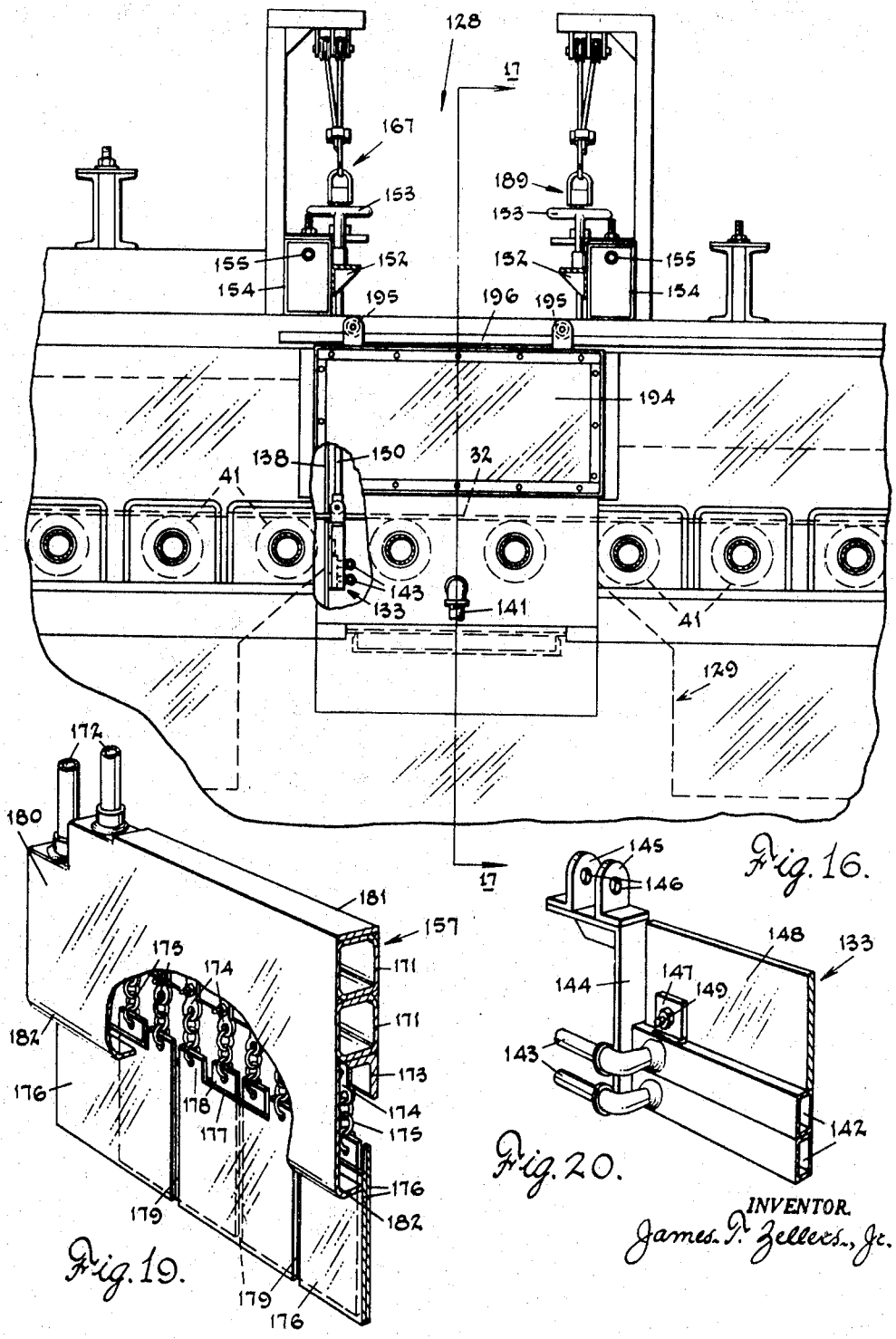

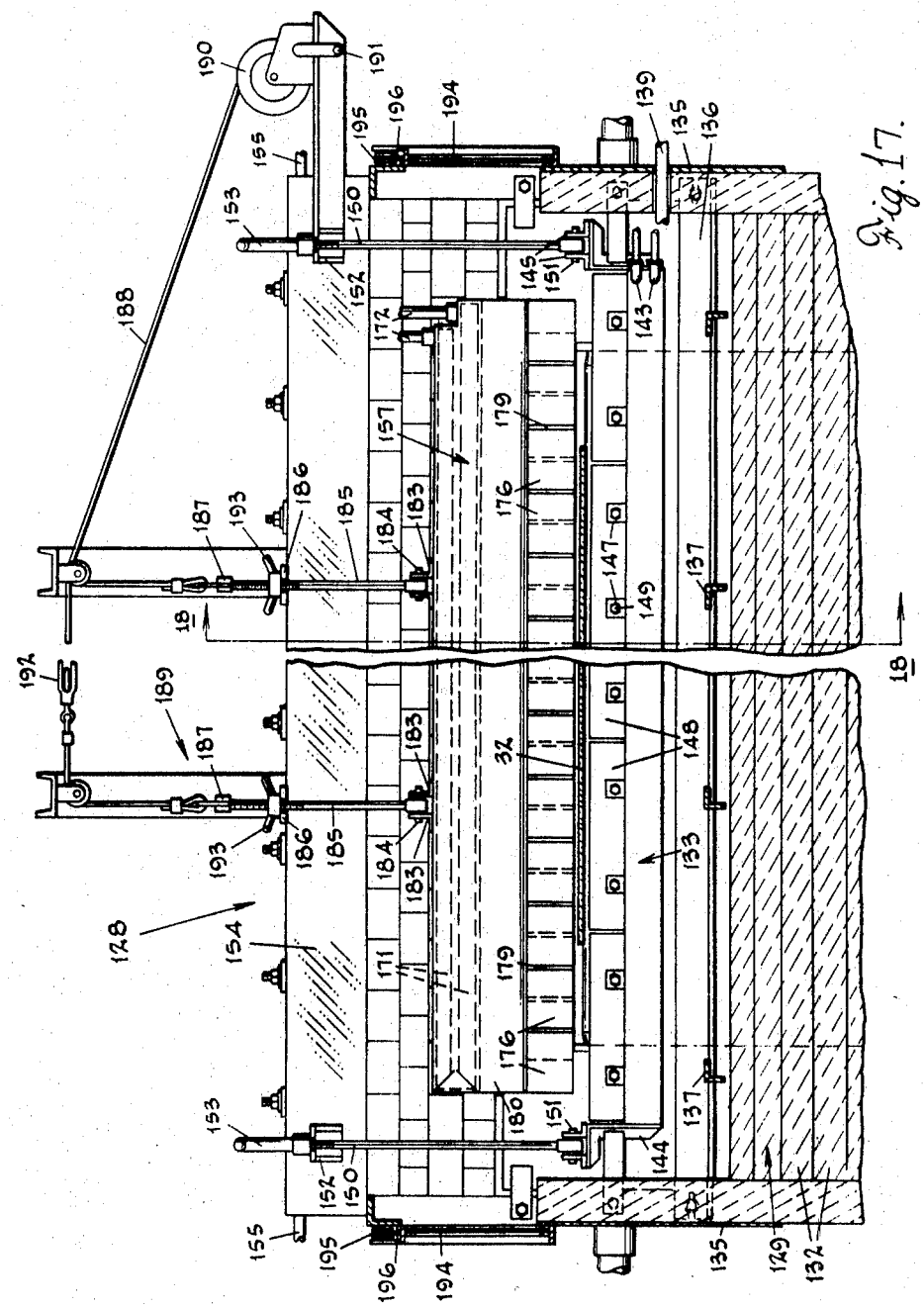

United States Patent Office 3,469,964
Patented Sept. 30, 1969

3,469,964
CUT-OFF VENTING MEANS FOR
SHEET GLASS PROCESS
James T. Zellers, Jr., Charleston, W. Va., assignor to
Libbey-Owens-Ford Glass Company, Toledo, Ohio, a
corporation of Ohio
Original application Sept. 17, 1962, Ser. No. 224,007, now
Patent No. 3,241,940, dated Mar. 22, 1966. Divided
and this application Sept. 3, 1965, Ser. No. 485,030
Int. Cl. C03b 25/04, 15/02
U.S. Cl. 65—194                          4 Claims

ABSTRACT OF THE DISCLOSURE

An elongated annealing lehr through which a continuous glass ribbon is carried on a series of horizontally aligned rolls for gradual cooling, including means closing off the space between the bottom of the sheet and the floor of the lehr at a pair of spaced locations to form a substantially closed chamber therebetween, means above said first named means closing off the space between the top of the sheet and the roof of the lehr at a pair of spaced locations forming a chamber therebetween, and an opening in the lehr roof venting the chamber above the sheet to the outside to prevent movement of convection currents throughout the full length of the lehr.

This application is a division of copending application Ser. No. 224,007, now Patent No. 3,241,940, filed Sept. 17, 1962.

The present invention relates broadly to the production of sheet or window glass, and more particularly it relates to improved techniques and apparatus for producing such glass with a minimum of distortion.

The terms "window" or "sheet" glass as used herein are intended to have the commonly accepted meaning in the trade of flat drawn glass having fire polished surfaces attained during formation of the sheet, as opposed to "plate" glass which has mechanically ground and polished surfaces. Such window glass is produced commercially by drawing a sheet or ribbon upwardly from a mass of molten glass directly into final usable form without the necessity of subsequent surfacing treatment to impart smoothness and transparency.

A major disadvantage of flat drawn glass has been distortion in the finished product. This objectionable distortion is caused by nonuniformity in the thickness of the sheet or, in other words, by a lack of parallelism between the opposite surfaces of the sheet in certain areas thereof. A number of different types of distortion are known in the trade according to their distinguishing characteristics, some of them being "hammer," "batter," "long wave distortion" and "short wave distortion."

In the past, it has been felt that this nonuniformity of thickness has been caused largely by conditions existing within the molten glass in the zone of sheet formation, and accordingly, corrective measures have largely been concentrated on the molten glass in that area. It is now known, however, that the distortion is the result of conditions of nonuniformity existing throughout the furnace and even within the lehr throughout which the sheet passes after its formation. Thus, it has been shown that the distortion defects in the sheet are partially due to a lack of temperature uniformity across the molten mass flowing into the zone of sheet formation, and partially due to the adverse effect of thermal or convection air currents upon the newly formed sheet. Furthermore, it has been found that the distortion which has heretofore been considered inherent in commercially produced window glass can be prevented by proper control of atmospheric and temperature conditions throughout the sheet producing apparatus.

It is therefore a primary object of this invention to produce window glass having substantially less distortion therein than heretofore commercially produced window glass.

Another object of the invention is to reduce the distortion in window or sheet glass by controlling the movement of thermal currents within the furnace in which the sheet is produced.

Another object is to reduce the distortion in sheet or window blass by maintaining a uniform temperature in the stream of molten glass across the furnace.

Still another object of the invention is to provide a quiescent atmosphere surrounding the sheet in the zone of sheet formation.

Yet another object is to reduce convection currents within the flattening chamber and annealing lehr to thereby prevent their adverse effect upon the ribbon.

Other objects and advantages of the invention will become more apparent during the course of the following description when taken in connection with the accompanying drawings.

In the drawings, wherein like numerals are employed to designate like parts throughout the same:

FIG. 2 is a longitudinal vertical sectional view through the working end of the furnace, taken substantially along line 2—2 of FIG. 1;

FIG. 3 is a longitudinal vertical sectional view through a portion of the flattening chamber and annealing lehr; taken substantially along line 3—3 of FIG. 1;

FIG. 5 is a transverse sectional view through the working receptacle and drawing chamber, looking toward the charging end of the furnace and taken substantially along line 5—5 of FIG. 4;

FIG. 6 is a transverse sectional view through the drawing chamber and draw pot, looking toward the annealing lehr and taken substantially along line 6—6 of FIG. 4;

FIG. 16 is a side elevation, with parts broken away, showing the lehr cut-off mechanism of the invention;

FIG. 17 is a transverse sectional view through the lehr taken substantially along line 17—17 of FIG. 16;

FIG. 19 is a perspective view, with parts broken away, of the heat shield of the lehr cut-off; and FIG. 20 is a perspective view, partially in section, of the lower screen of the lehr cut-off.

Figure 1:
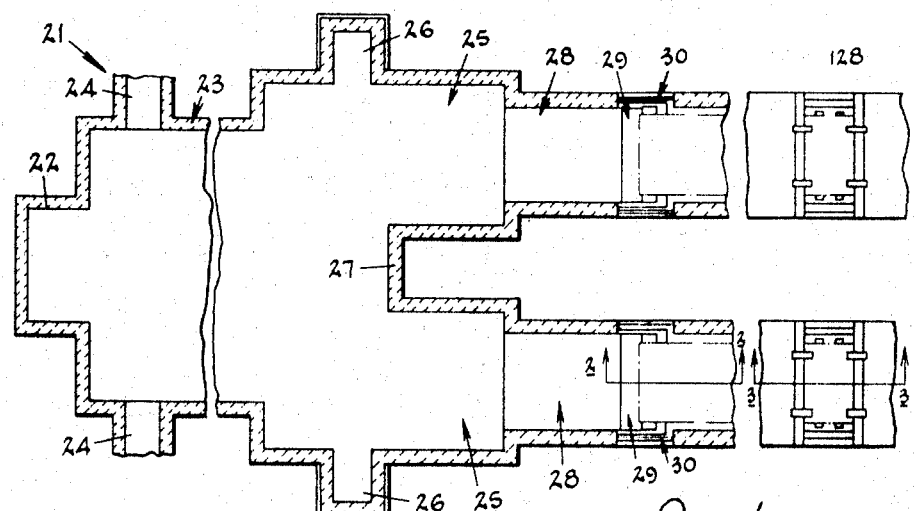
FIG. 1 is a fragmentary plan view of a window or sheet glass furnace and particularly the refining and working end thereof.

Referring now to the drawings, and more particularly to FIG. 1, thereof, there is shown a continuous sheet or window glass furnace designated in its entirety by the numeral 21. Conventional furnaces of this type generally include a so-called doghouse 22 into which the raw glass-making materials are charged, either continuously as a blanket or intermittently in lumps, and floated by a bath of molten glass. The glass-making materials are carried by the molten bath into a melting chamber 23 where they are heated by a plurality of gas fired burners (not shown) and regenerating chambers 24 spaced along the sides thereof. As the materials melt, they are integrated into the molten mass which flows into one or more refining chambers 25. Impurities which float upon the molten bath are caused, by the movement of the bath, to flow into skim pockets 26 at the sides of the refining chamber where they are periodically removed. As shown herein, there is provided a pair of refining chambers 25 in communication with the melting chamber and separated by a crotch wall 27.

Figure 4:
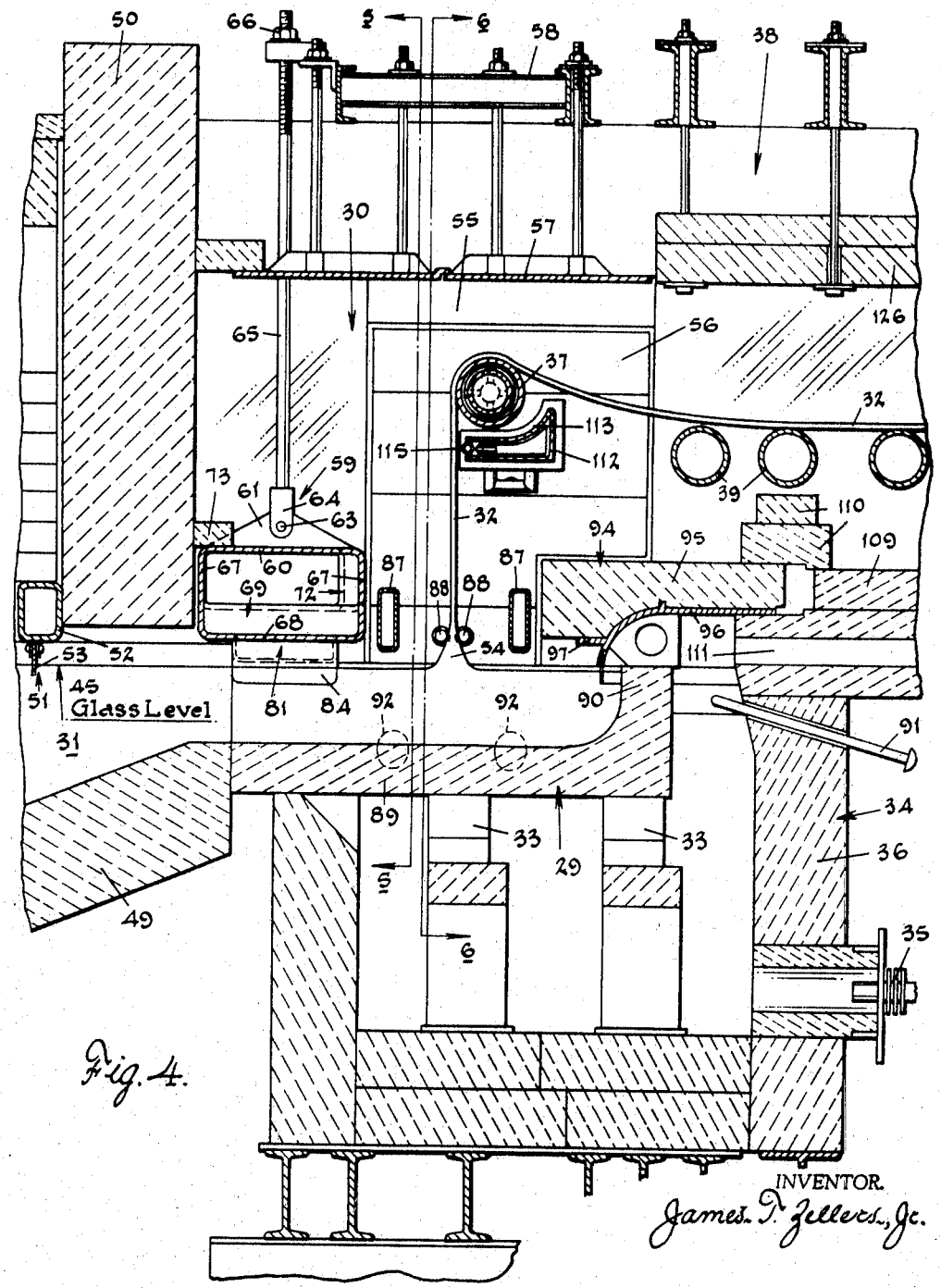
FIG. 4 is an enlarged longitudinal sectional view through the drawing chamber and draw pot.

Although not restricted thereto, the present invention is particularly well adapted for use with the so-called Colburn type of window glass machine and will be described in connection with such a machine herein. Thus, the refining chamber is connected by a cooling chamber 28 to a relatively shallow draw pot 29 above which is positioned a drawing chamber 30 (FIGS. 2 and 4).

In a continuous tank furnace of the type above described, the mass of glass 31, after being reduced to a molten state in the melting chamber 23, flows into the refining chamber 25 where it is properly conditioned for formation into the ribbon. Thereafter the molten glass flows through the cooling chamber where its temperature is gradually brought down to the level necessary for drawing into ribbon form, and finally it flows into the draw pot or working receptacle 29 from which the sheet or ribbon 32 is continuously drawn.

The draw pot 29 in a Colburn type machine is conventionally supported uopn pot stools 3 (FIG. 2) within a pot chamber 34 which is heated by flames from burners 35 introduced into the pot chamber through openings in the forward wall 36 thereof. The sheet or ribbon of glass 32 is continuously drawn vertically upward from the surface of the molten mass within the draw pot 29, and, while still in a semi-plastic condition although substantially set in its final sheet form, is deflected about a bending roll 37 into a horizontal plane. The sheet thereafter passes through a flattening chamber 38 upon a series of horizontally aligned machine rolls 39 and into a lehr 40 where it is supported and advanced upon a series of horizontally aligned rolls 41 until suitably annealed and cooled to substantially room temperature. The ribbon is then severed perpendicular to its longitudinal axis at periodic intervals by a cutter (not shown) so as to form rectangular individual sheets suitable for further processing.

It has long been known that in order to prevent thickness variations in the ribbon, the temperature of the molten glass must be uniform across the width of the furnace and particularly in the zone of sheet formation. It has also been found that distortion and imperfections in the finished product can be substantially reduced by controlling the movement of the air currents above the molten glass and between the various sections of the furnace and the annealing lehr. Control of such air movements not only results in increased uniformity in the temperature of the molten glass entering the draw pot, but also prevents solid particles, either products of combustion from the burners or unmelted particles of the glass batch components, from being carried by the air currents into the working zone of the furnace where they may emerge as imperfections in the finished product known in the art as stones.

To this end, there is provided at the junction between the refining chamber 25 and the cooling chamber 28 of the furnace an arch 42 which separates the atmosphere above the molten bath in those two sections. The arch 42 is composed of spaced rear and forward walls 43 and 44, respectively, which extend transversely between the opposite side walls of the furnace and downwardly so as to leave a small space between their lower edge and the surface 45 of the stream of molten glass 31. A so-called C-bar 46 is mounted in the space between the walls 43 and 44 by means (not shown) which permit it to be easily adjusted vertically as well as to be removed for replacement. A horizontal leg 47 of the C-bar is disposed below the surface 45 of the molten mass and extending in the direction of flow thereof to completely seal off the atmosphere in the refining chamber from that in the cooling chamber.

There is a natural tendency for the stream of molten glass to cool more rapidly at its edges where heat is conducted through the sidewalls of the furnace than at the center thereof. The C-bar 46, when properly immersed in the molten stream which, as viewed in FIG. 2, flows from left to right, causes a backflow of the hotter molten glass from the center of the stream to be set up toward the cooler edges, thus resulting in a more uniform temperature across the stream. The immersed C-bar also has a tendency to collect at its rear surface any unmelted particles of batch material which may be floating upon the molten glass and retain such particles until such time as they are melted and absorbed in the mass.

Since the C-bar is adjustably mounted, it can be raised or lowered between the walls 43 and 44 to regulate the depth of immersion in the molten glass according to fluctuating operating characteristics, and thereby to control the currents in the molten glass toward the edge of the furnace. A refractory cover 48 closes the gap between the walls 43 and 44 and rests upon the upper surface of the C-bar to prevent the escape of heat from the interior of the furnace and to prevent dirt and the cooler outside air currents from entering the furnace.

The cooling chamber 28, wherein the depth of the glass bath is reduced from that of the refining chamber to that of the relatively shallow draw pot 29 by a floor 49 inclining upwardly in the direction of flow of the bath, is separated from the drawing chamber by an end wall 50 extending between the side walls of the furnace. It is, of course, particularly important to prevent the entrance of air currents into the working or drawing chamber because such currents not only disturb the atmosphere surrounding the newly formed sheet, but aslo cause temperature variations on the surface of the molten bath and in the meniscus from which the sheet is drawn, thus resulting in thickness variations across the sheet. As a further precaution against floating particles and nonuniform molten glass entering the zone of sheet formation, as well as to completely seal off the atmosphere above the molten glass in the cooling chamber from the drawing chamber, a skimmer 51 (FIGS. 2 and 4) extends across the exit end of the cooling chamber and closes the space between the bottom of the end wall 50 and the surface 45 of the molten bath. The skimmer includes a tube 52 generally rectangular in cross section and having a flange 53 extending downwardly therefrom a short distance into the molten glass. Both the rectangular tube 52 and the flange 53 are preferably made from a heat conductive material for a purpose to be hereinafter more fully described. Thus, the tube itself is generally made from stainless steel, with the flange being made from a material highly resistant to corrosion by the molten glass. Two such materials are platinum and an alloy known as "Hoskins Metal," the latter including in its composition about 71% iron, about 22.5% chromium, about 5.5% aluminum and about 0.5% silicon.

Skim bars of one type or another have been employed in the refining chamber of a melting furnace for their value in preventing ream in the sheet. However, deposits of devitrified material were found to build up on these skim bars, necessitating frequent cleaning or replacement of the bars. This procedure required a considerable amount of time and resulted in a loss of production by the furnace during each such cleaning so that the skim bars were not entirely satisfactory. According to the present invention, a source of heat (not shown) such as a conventional gas fired burner may be introduced into the ends of the tube 52 from outside the sidewalls of the cooling chamber to cause the tube to be heated without introducing the gases of combustion into the cooling chamber or disturbing the quiescent atmosphere therein. The flange 53 is in turn heated by conduction from the tube 52 and heat is also radiated to the surface of the glass from the tube. By virtue of the fact that it is heated to a temperature above the solidifying point of the glass, there is little or no buildup of divitrified material upon the flange or tube of the skimmer 51, and thus it can be used indefinitely without causing a costly loss of production for cleaning or replacement.

Temperature control of the glass bath is, of course, extremely critical in the region where it is drawn upwardly from the surface 45 through the meniscus 54 and into sheet form. Thus, the temperature across the molten bath must, of necessity, be uniform at that point in order to obtain a sheet of uniform thickness. Due to the nature of the Colburn process, the molten bath is relatively shallow within the draw pot so that even slight variations in temperature across the incoming stream of glass, unless corrected, have a noticeable effect upon the sheet. Likewise, it has been found that the atmosphere surrounding the sheet and in contact with the meniscus and surface of the glass bath in the drawing chamber must be maintained in a quiescent condition in order to prevent the introduction of distortion into the sheet.

Figure 11:
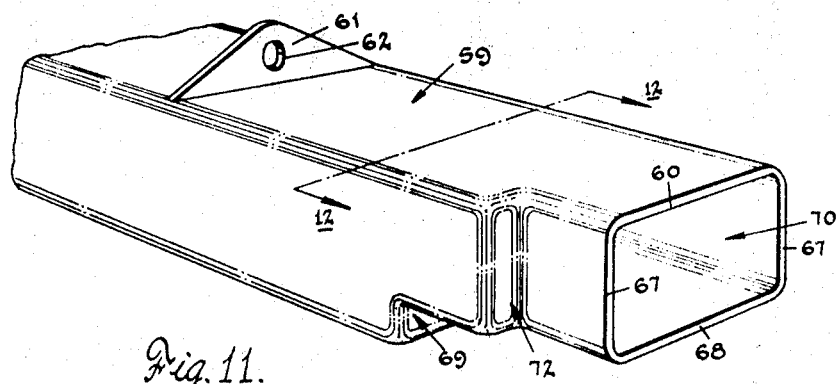
FIG. 11 is a perspective view of a portion of the hollow muffle lip-tile of the invention.
Figure 12:
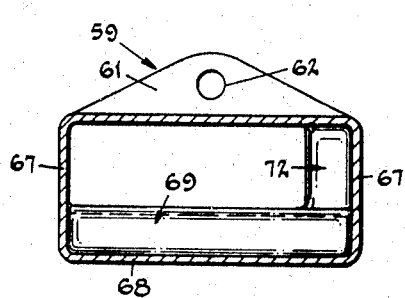
FIG. 12 is a transverse sectional view of the muffle lip-tile, taken substantially along line 12—12 of FIG. 11.

To achieve this quiescent atmosphere and to permit the temperature of the molten bath to be accurately controlled, the drawing chamber is enclosed by sidewalls 55 and a machine enclosure 56 (FIGS. 5 and 6) and a roof 57 supported by a suitable framework 58, the details of which do not constitute a part of the present invention. As a further precaution against the entrance of injurious convection currents from the cooling chamber into the drawing chamber, as well as to permit further temperature control over the molten glass stream, there is located across the entrance end of the drawing chamber 30 a novel hollow muffle lip-tile 59 as best seen in FIGS. 2, 4 and 5. The lip-tile 59 is generally rectangular in cross section and is made of a material exhibiting high heat conductivity, such as stainless steel, so that in a manner to be hereinafter more fully described, heat introduced into the interior of the lip-tile will be radiated to the surface of the molten bath. Thus, as shown in FIGS. 11 and 12, the upper surface 60 of the lip-tile carries a pair of flanges 61 having openings 62 therein through which a pin 63 passes to attach the lip-tile to the clevis 64 of a suspending rod 65. The suspending rod passes through the roof 57 and is attached to the framework 58 in a manner to permit the height of the lip-tile to be adjusted vertically by an adjusting nut 66 threaded onto the upper end of the suspending rod. The rectangular configuration of the lip-tile 59 is completed by sidewalls 67 and a bottom wall 68 which is located closely adjacent the surface of the glass bath.

The lip-tile is provided with reduced portions or offsets at its ends at 69 on the lower wall in order to permit the open end 70 to extend over the sidewall 71 of the draw pot as shown in FIG. 5, with the bottom wall 68 of the lip-tile closely adjacent the surface of the molten bath. A similar offset 72 located in one of the sidewalls 67 reduces the size of the open end 70 which extends through the drawing chamber sidewall 55 and adapts the lip-tile to receive burners in a manner to be described. The lip-tile is mounted closely adjacent the end wall 50 of the cooling chamber, and a refractory block 73 placed upon the upper wall of the lip-tile seals the opening against the entrance of air currents from the cooling chamber.

Conventional gas-fired burners (not shown) are introduced into the open ends of the lip-tile from outside of the drawing chamber. It is thus possible to heat the molten bath as it approached the meniscus by heat radiated from the lip-tile, without introducing into the drawing chamber the harmful convection currents and products of combustion normally associated with such burners. The amount of heat so radiated can be controlled by varying the amount of heat introduced into the lip-tile and by raising or lowering the lip-tile to alter the distance between the lower, radiating surface 68 thereof and the glass bath. The lip-tile also acts, due to its proximity to the surface 45, as an additional seal against the passage of air currents from the cooling chamber beneath the end wall.

Figure 13:
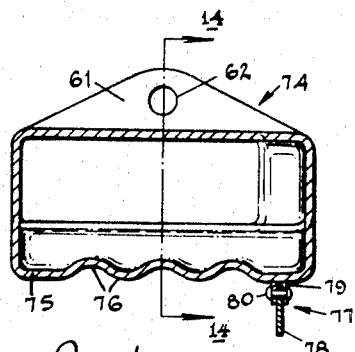
FIG. 13 is a transverse sectional view through a modified hollow muffle lip-tile.
Figure 14:
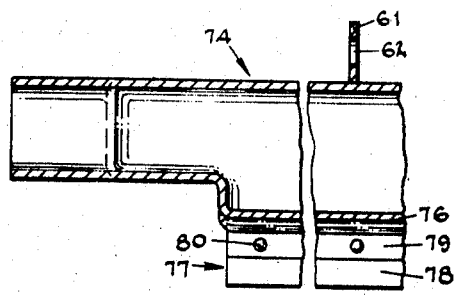
FIG. 14 is a longitudinal sectional view of the modified muffle lip-tile, taken substantially along line 14—14 of FIG. 13.

There is shown in FIGS. 13 and 14 an alternate embodiment of the muffle lip-tile of FIGS. 11 and 12. As shown therein, the lip-tile 74 is identical to the lip-tile 59 except that the lower wall 75 which faces the glass bath is provided with corrugations 76 in order to better diffuse the heat radiated therefrom, thus heating the glass bath more uniformly. The lower wall is also provided with a sealing leg 77, the leg comprising a plate 78 mounted between projections 79 on the lower wall 75 by rivets or other suitable fasteners 80, and operates much in the manner of the skimmer 51 above described and may, in certain instances, replace the skimmer. Thus, the lip-tile is positioned so that the leg 77 is partially immersed into the molten bath to act as a skimmer for floating material and also as a positive seal against the entrance of air currents from the cooling chamber. As in the case of the flange 53, the sealing leg is generally made of a highly corrosion resistant material such as platinum or the previously described alloy known as "Hoskins Metal." Heat introduced into the lip-tile is conducted to the leg 77 causing the leg to be maintained at a temperature above that at which devitrified material will normally form thereon.

There has been a tendency for devitrified material to form along the sidewalls at the exit end of the cooling chamber in the vicinity of the end wall 50 due to the natural tendency for the bath to be cooler along the edges thereof in contact with the refractory walls. Should the temperature of the entire molten mass be elevated to a point sufficient to retard or prevent this formation along the sidewalls in the vicinity of the end wall 50, the temperature at the center of the stream within the draw pot would, as a result, be too high for satisfactory drawing of the sheet. There is thus provided at each edge of the furnace in the vicinity of the end wall 50 an edge heater 81 as shown in FIGS. 2, 4 and 5. One or more of these edge heaters may be located as found necessary and desirable within the exit end of the cooling chamber, or within the draw pot should devitrification occur therein. The edge heaters are also useful, of course, to overcome the natural tendency of the molten mass to be cooler at the edges than at the center, even where devitrification does not occur, and can be used to heat the edges to more nearly equalize the temperature across the stream.

Figure 15:
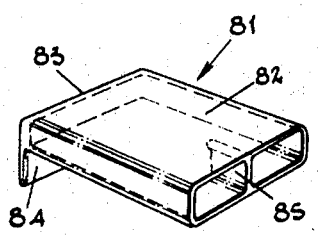
FIG. 15 is a perspective view of the edge heater of the invention.

As best illustrated in FIG. 15, the edge heaters 81 include a rectangular chamber 82, one of whose ends is closed by a heat conductive plate 83 having an extended edge portion 84. At its other end, the chamber 82 is provided with a short dividing wall 85 for controlling flames from burners 86 directed into the chamber (FIG. 5). As installed in the furnace according to FIG. 5, the chamber of the edge heater 81 rests upon the wall 71 of the draw pot, with its extended edge portion closely adjacent the inner surface of the wall and partially submerged in the molten glass. The sidewall 55 of the drawing chamber encloses the edge heater so as to seal out the outside atmosphere, and the flames from one or more of the burners 86 are directed into the rectangular chamber 82 to cause heating of the heat conductive plate 83. The extended edge portion 84 which is immersed in the glass is heated by conduction to a temperature above the devitrification point of glass and this feature, along with the heat radiated to the bath by the plate 83, prevents the accumulation of devitrified material in the vicinity of the edge heater.

As the sheet 32 is drawn upwardly from the meniscus 54, it is generally caused to set in substantially final form by sheet coolers 87 located on either side which absorb heat therefrom before it is deflected about the bending roll 37. Due to the natural tendency of the sheet to narrow to a thread when drawn upwardly from the meniscus, knurled width maintaining rolls 88 are conventionally employed to engage the edges of the sheet and maintain it at a predetermined width. In drawing apparatus of the Colburn type, difficulty has often been encountered in that the molten glass in the draw pot immediately beneath the knurled rolls is at a somewhat lower temperature than in the central area of the draw pot. As a result, the knurled rolls form an unusually thick bulb at the edges of the sheet, causing a large amount of waste in that area. Also, the knurled rolls engaging the more viscous material at the edge of the sheet introduce distortion into the relatively less viscous central area of the sheet, thereby causing distortion which results in a considerable amount of the glass sheet being unacceptable.

As previously described, burners 35 have been introduced into the pot chamber 34 through the front wall 36 thereof to cause hot gases to circulate around the sidewalls 71, floor 89 and end wall 90 of the draw pot 29 and to thereby control the temperature of the molten glass within the draw pot. Thermocouples 91 within the pot chamber are used in the conventional manner to control the operation of the burners 35. However, it has been found that adding heat in this manner tends to raise the temperature of the entire molten mass while maintaining a temperature differential between the edge areas and the center of the mass. Edge burners 92 (FIGS. 4, 5 and 6) introduced through the sidewalls 93 of the pot chamber and directed against the outer surface of the sidewalls 71 of the draw pot directly below the meniscus and knurled rolls have been found, on the other hand, to cause an elevation of the temperature of the edge of the molten glass stream relative to the inner areas thereof, thereby counteracting the natural tendency of the stream to cool most rapidly at its edges. The burners may be of a conventional type, and their number and location may vary according to operating conditions. However, two burners 92 at each edge of the pot, located as shown in FIG. 4 with one on either side of the meniscus, have given excellent results in providing and maintaining temperature uniformity across the draw pot.

The atmosphere within the pot chamber 34 is, of course, extremely turbulent and a great amount of foreign matter is created as a by-product of the combustion of the gases from the burners 35 and 92. The turbulent atmosphere and the dirt from the pot chamber have an extremely harmful effect upon the sheet when allowed to enter the drawing chamber. It was formerly felt, nevertheless, that it was necessary for the hot gases from the pot chamber to rise up over the rear wall of the pot and contact the molten glass therein to prevent devitrification along the rear wall. According to the present invention, however, there is provided a rear lip-tile 94 which completely seals off the turbulent atmosphere in the pot chamber from the drawing chamber and, at the same time, prevents the formation of devitrified material along the rear wall of the draw pot. As will be apparent in FIGS. 4 and 7 through 10, the novel rear lip-tile comprises a refractory block 95 supported upon a carrier frame 96 extending across the rear of the draw pot. The carrier frame, which is made from a material exhibiting relatively high heat conductivity such as stainless steel, includes a body portion generally arcuate in cross-section and complementary to the undersurface of the refractory block 95 which rests thereupon. A horizontal ledge 97 projects out from the carrier frame to support the refractory block in the region where the main body of the carrier frame curves downwardly away from the block toward the molten glass. A key 98 extends across the carrier frame and fits into a corresponding keyway 99 in the refractory block to prevent relative movement between the two members. The lower edge of the carrier member is notched intermediate its ends at 100 to receive a sealing member 101 having turned back ends 102 for a purpose to be described.

Figure 9:
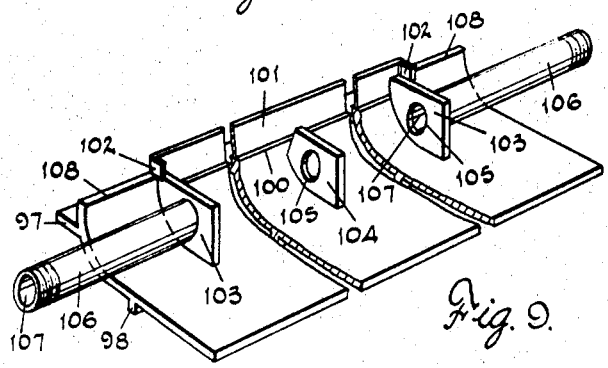
FIG. 9 is a perspective view of the rear lip-tile supporting member, with parts broken away.

It is necessary to accurately position the rear lip-tile 94 within the drawing chamber and also to provide for its removal and replacement periodcally while the furnace is in operation. To this end, a pair of end mounting brackets 103 and one or more intermediate mounting brackets 104 are attached to the underside of the carrier frame as shown in FIG. 9. The brackets have aligned openings 105 and short pipes 106 are attached to the outer faces of the end mounting brackets 103 with their central bore 107 in alignment with the openings 105. A rod (not shown) carried by a conventional lift truck or overhead crane is inserted through the central bore 107 of the pipes 106 and aligned openings 105 to lift the lip-tile for installation or removal. The short pipes 106 also serve to support the lip-tile when in position in a conventional manner (not shown).

Figures 7, 8:
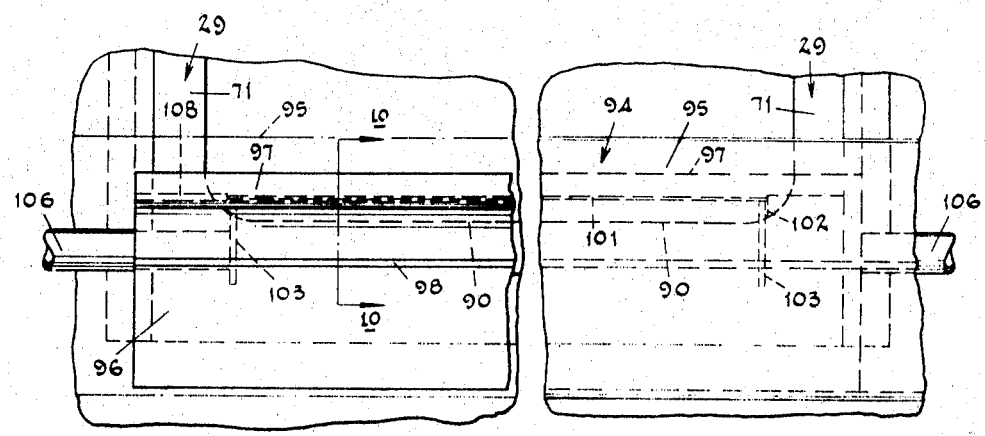
FIG. 7 is a fragmentary plan view of the supporting member for the rear lip-tile installed at the rear of the draw pot.
FIG. 8 is a fragmentary plan view of the rear lip-tile installed upon the supporting member at the rear of the draw pot.
Figure 10:
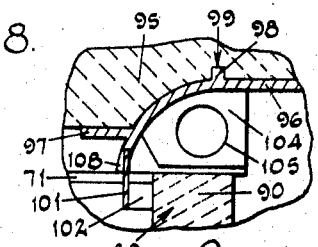
FIG. 10 is a transverse sectional view through the rear lip-tile and dip seal associated therewith, taken substantially along line 10—10 of FIG. 7.

When mounted in operating position with the principal part of its weight being carried by the pipes 106, the edge of the end mounting brackets 103 and the edge of the extensions 108 of the carrier frame rest upon the top of the end wall 90 of the pot chamber to seal off the corner areas of the draw pot from the pot chamber as shown in FIGS. 7 and 8. The sealing member 101 and the turned back ends 102 thereof are immersed in the molten bath, with the ends 102 abutting against the inner surface of the end wall 90 of the draw pot, to thereby provide a positive dip seal against the ingress of hot gases from the pot chamber into the pot. To minimize the corrosive effect of the molten glass upon the sealing member, it is preferably made of the aforedescribed alloy known as "Hoskins Metal."

The rear edge of the lip-tile 94 rests upon the floor 109 of the flattening chamber 38, and refractory blocks 110 overlap the edges of the floor and lip-tile to maintain the lip-tile in sealing relationship against the floor 109, and serve the further purpose of partially closing off the space beneath the ribbon between the floor 109 and the machine rolls 39.

The hot gases from the burners 35 and 92 circulate through the pot chamber around the draw pot and exit through an exhaust system 111 in the floor of the flattening chamber and annealing lehr. In circulating, the gases also cause the heat-conducting carrier frame 96 to be heated which, in turn, both radiates heat to the molten bath and heats the partially immersed sealing member 101. This additional heat in the rear area of the draw pot has been found to prevent the devitrification heretofore common to that area.

The bending roll 37 over which the sheet or ribbon 32 passes in changing from the vertical to the horizontal plane generally must be cooled in some manner, such as by circulating air or liquid through the interior thereof, due to the relatively high temperature of the ribbon with which it is in contact. This interior cooling of the bending roll has not proven entirely satisfactory because of an inability to cool the roll, or in other words to remove heat from the roll, at a uniform rate entirely across its width. Consequently, the ribbon is cooled nonuniformly across its width, resulting in distortion and internal stresses therein. To this end, there has been shown in FIGS. 2, 4 and 6 an external bending roll cooler 112 located beneath the bending roll to absorb heat therefrom. The cooler, which may either be used alone or in conjunction with conventional bending roll cooling apparatus, has a contoured heat absorbing surface 113 which absorbs heat over the portion of the roll surface not in actual contact with the ribbon. The cooler is provided at one end with suitable piping 114 for circulating a heat absorbing medium therethrough, and has conventional control means (not shown) for regulating the rate of flow of the heat absorbing medium according to the cooling requirements of the bending roll.

The bending roll cooler 112 also serves the additional purpose of providing a layer of inert nonflammable gas adjacent the roll contacting surface of the ribbon as it passes over the bending roll. Thus, there is provided a manifold pipe 115 in the edge of the cooler facing the vertically rising ribbon. The manifold pipe has a row of spaced perforations 116 positioned so as to direct the gas against the surface of the ribbon, and is connected through suitable tubing 117 to a source of the gas under pressure. It has been found that certain gases directed against the ribbon in this manner form a lubricating film between the bending roll and the ribbon and prevent injury to the surface of the ribbon when passing over the bending roll. A number of gases have been found well suited for this purpose, one of the most beneficial being sulphur dioxide due to its inert properties and nonflammability.

As earlier described, there are provided sidewalls 55 and machine enclosure walls 56 for the drawing chamber in order to maintain the atmosphere surrounding the sheet in the zone of sheet formation in a quiescent condition as well as to prevent the entrance of foreign material. A considerable amount of the apparatus in the drawing chamber, such as the muffle lip-tile 59, edge heaters 81, sheet coolers 87, knurled rolls 88 and bending roll cooler 112, either extend through the drawing chamber sidewall 55 and machine enclosure wall 56 or have supply connections which extend therethrough. However, these members are generally stationary at the point where they pass through the wall and are relatively small so that the walls can be sealed around them. The bending roll 37, as shown in FIG. 6, extends out beyond the machine enclosure walls 56 to be supported and driven, and is of relatively large diameter and must turn constantly while the machine is in operation so that the wall may not easily be sealed around it in the usual fashion. Due to its diameter, even a small opening between the periphery of the roll and the wall 56 will permit a relatively large amount of air to pass. According to the present invention, the bending roll 37 is supported in the usual manner at its ends 118 and is driven by conventional mechanism 119 at the proper speed. A cover 120 having a cylindrical projection 121 thereon encloses the supported end 118 of the roll. One end of an enclosure sleeve 122 of slightly larger diameter than the cylindrical projection 121 slides over the cylindrical projection and has a circular flange 123 at its other end which abuts the machine enclosure wall 56 surrounding the bending roll and seals the opening in the wall. The circular flange 123 of the enclosure sleeve is held in sealing engagement with the wall 56 by a thumb screw 124 threaded into the sleeve 122 with its end abutting against the cylindrical projection 121.

Between the area where the sheet is formed and passes over the bending roll 37 and the point where it leaves the lehr 40 at substantially room temperature, there is a temperature drop of several hundred degrees Fahrenheit. This large temperature differential has a tendency to cause air movement within the lehr and flattening chamber from the cooler end toward the warmer end as the air is caused to expand by being heated. In order to minimize the movement of this air into the drawing chamber where the sheet is being formed and where any such disturbance will produce distortion therein, it has been customary to suspend barriers 125 (FIG. 2) of a suitable material from the roof 126 of the flattening chamber approximately at the entrance to the annealing lehr, the barriers extending downwardly nearly to the upper surface of the ribbon. Barricades 127 are also positioned on the floor 109 beneath certain of the machine rolls 39 and lehr rolls 41 to restrict the movement of air currents beneath the ribbon.

Uncontrolled air movement within the lehr can also have a deleterious effect upon the sheet by causing uneven cooling, thereby resulting in improper annealing. As a further aid in controlling the movement of air within the lehr and flattening chamber in the direction of the drawing chamber, that is, the so-called chimney effect, as well as to control the annealing of the sheet, there is provided at one or more positions along the annealing lehr a lehr cut-off 128 (FIGS. 3 and 16 to 20). The lehr cut-off, in effect, provides an interruption or vent in the ribbon-enclosing tunnel formed by the flattening chamber and lehr, and prevents the formation of rapidly moving convection currents which can carry dust and dirt the full length of the lehr and into the forming chamber. Thus, there is provided a bulkhead 129 resting upon the lehr floor 130 and, in the embodiment shown in FIG. 3, closing off the end of the pot chamber exhaust system 111 in the lehr floor. The combustion gases within the exhaust system circulate through the floor to aid in heating the flattening chamber and lehr and are withdrawn through ports 131 near the bulkhead 129.

The bulkhead 129 includes a plurality of refractory bricks 132 arranged to form, with a pair of lower screens 133, a chamber 134 beneath the ribbon or sheet. The chamber may enclose one or more rolls 41, two such rolls being shown as enclosed for purposes of illustration in FIG. 18. Extending between the sidewalls 135 of the lehr are angle members 136 which are maintained in spaced apart relation by a plurality of spaced, longitudinally arranged struts or slats 137 (FIGS. 17 and 18) formed from angle irons having their vertical flange removed for a sufficient distance at either end to permit the horizontal flange to rest upon the angle members 136. Vertical plates 138 are connected to the angle members and extend across the lehr and upwardly around the edges of the ribbon (FIGS. 17 and 18) to close off the chamber at its ends.

Due to the opening in the lehr at the cut-off, a certain amount of heat will escape and in some instances may result in undue cooling of the ribbon, particularly where the cut-off is large enough to enclose two or more rolls. To compensate for this loss of heat, there is provided in the chamber 134 beneath the ribbon and extending transversely thereof, a manifold 139 having a plurality of burner jets 140 spaced thereacross. Supply tubes 141 connect the manifold to a source of fuel, and suitable valves (not shown) regulate the rate of burning to control the amount of heat supplied to the chamber.

The lower screens 133, as will be apparent in FIG. 20, comprise elongated conduits 142 adapted to serve as beams for the screens. The elongated conduits are interconnected at one end and have suitable junctions 143 at their other end for connection to a supply (not shown) of a heat absorbing medium for circulation therethrough. The elongated conduits are also fastened at either end to carrying brackets 144 having at their upper ends spaced lugs 145 containing openings 146 for a purpose to be described. Secured to the top of the upper elongated conduit 142 as by welding are a plurality of tabs 147 to which a series of closure plates 148 are secured by bolts 149. Although a single closure plate may extend entirely across the furnace, it has been found that dividing the plate into sections substantially reduces warping due to the effect of heat.

In position, the lower screens 133 extend across the lehr between adjacent lehr rolls 41 with the top edges of the closure plates 148 closely adjacent the lower surface of the ribbon or sheet 32 so as to substantially prevent the passage of air therebetween. The screens 133 are carried by supporting rods 150 connected at their lower ends to the spaced lugs 145 by pins 151 passing through the openings 146. The upper ends of the supporting rods 150 are received through openings in brackets 152 carried by the structural framework of the lehr roof, and adjusting handles 153 threaded thereon abut against the brackets 152 and permit either or both sides of the screens 133 to be raised or lowered to vary the distance between the undersurface of the ribbon and the closure plates 148, thereby varying the effect of the screens to meet changes in operating conditions. The structural framework includes hollow buckstays 154 positioned adjacent the opening in the lehr roof and having unions 155 for circulating a heat absorbing medium through the buckstays from a source (not shown).

Above the sheet or ribbon, air movement at the lehr cut-off 128 is controlled by a vertically adjustable curtain 156 located at the drawing chamber side of the cut-off and by a vertically adjustable heat shield 157 positioned over the ribbon at the other side thereof. The roof section 158 at the lehr cut-off is open to vent the sheet-enclosing tunnel formed by the lehr, thus imparting to it the characteristics of separate chambers to reduce the chimney effect therein.

The vertically adjustable curtain 156 includes parallel ducts 159, interconnected at one end and connected at their other end to a supply (not shown) of a heat absorbing medium such as water for circulation therethrough. The ducts, thus cooled, serve as a supporting beam for the curtain in a manner similar to the elongated conduits 142, and are not affected by the relatively high temperatures to which they are exposed. Suspended from the bottom of the lower of the ducts 159 by a plurality of hanger chains 158 is a cut-off screen 161 which extends downwardly substantially to the surface of the ribbon. The upper duct 159 carries pairs of ears 162 which are attached to adjusting rods 163 extending through openings in bars 164 mounted upon the structural framework of the lehr. At their upper ends, the adjusitng rods 163 are connected through clevises 165 to the cables 166 of a conventional cable winch system 167 also carried by the structural framework; the winch system includes a drum 168 operated by a crank 169 for raising and lowering the curtain 156 to adjust its height relative to the ribbon 32. Winged taps 170 threaded onto the adjusting rods 163 are adapted to bear upon the upper surface of the bars 164 and support the curtain in its properly adjusted position.

The heat shield 157, as will be evident in FIG. 19, comprises cooling tubes 171 extending across the lehr, interconnected at one end and having unions 172 at their other end for circulating a heat absorbing medium such as water therethrough from a source (not shown). An angularly shaped bracket 173 secured to the bottom of the lower cooling tube 171 carries a plurality of eyes 174 spaced across its vertical leg. Supported by the eyes are short lengths of chain 175 from which are suspended baffle plates 176. The baffle plates are centrally notched at 177 along their top edge to form a carrying tab 178 at either corner to permit the baffles to be mounted in overlapping fashion, whereby the intermediate spaces 179 between them will be closed while at the same time retaining a certain amount of flexibility in the heat shield. A damping cover 180 having a horizontal leg 181 extending over the top of the cooling tubes and a lower extension 182 abutting against the baffles 176 is mounted upon the cooling tubes 171 in order to damp oscillations of the suspended baffles due to air currents impinging thereon.

Figure 18:
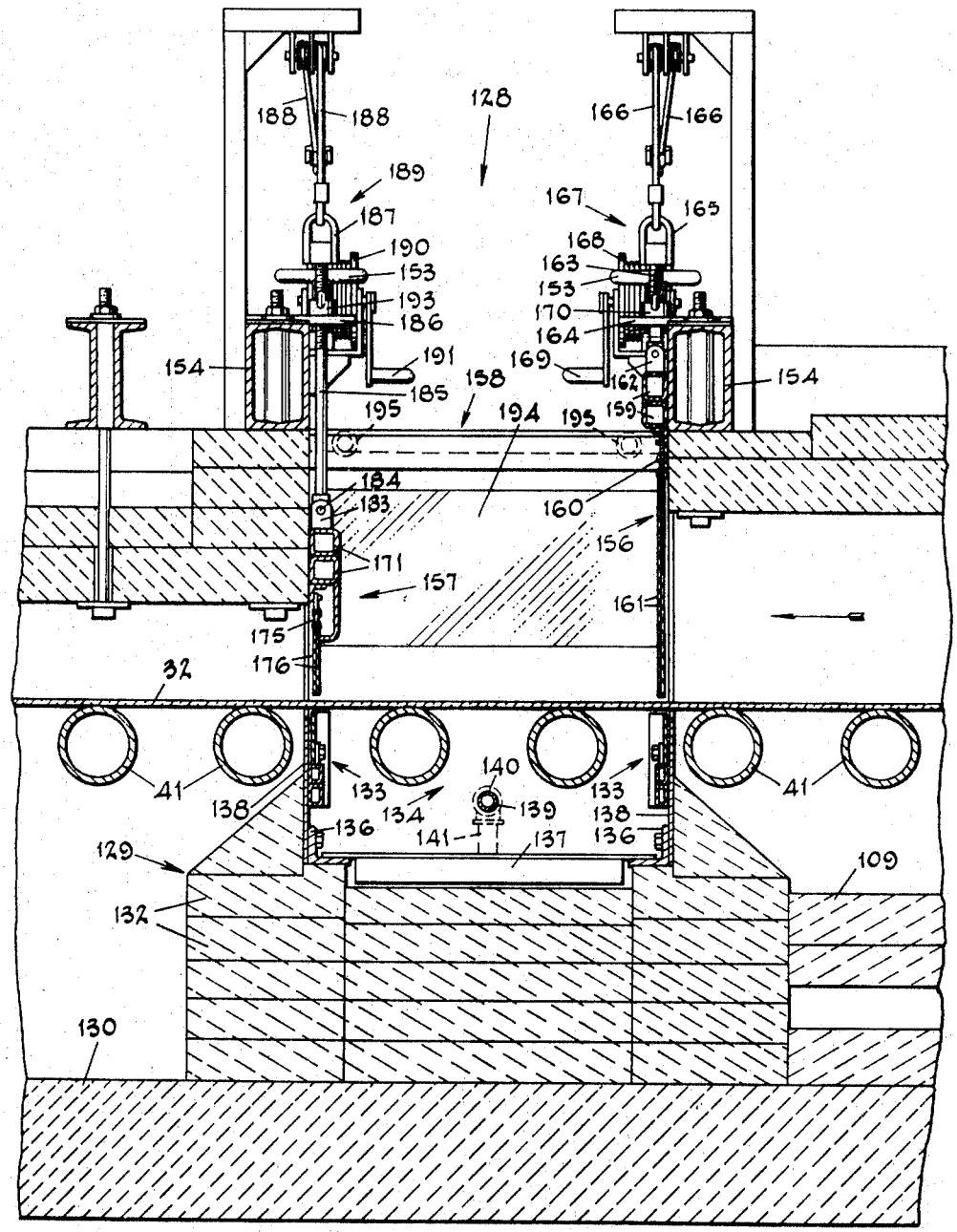
FIG. 18 is a longitudinal sectional view of the lehr cut-off taken substantially along line 18—18 of FIG. 17.

Spaced ears 183 carried by the horizontal leg 181 of the damping member are pin connected at 184 to the lower end of elongated rods 185 (FIG. 18). The elongated rods pass through openings in cantilevered bars 186 carried by the structural framework and are connected at their upper end through clevises 187 to the cables 188 of a conventional cable winch 189 similar to the winch 167 and also mounted upon the structural framework. The cable winch has a drum 190 connected to a handle 191 for adjusting the heat shield to the desired height above the sheet and for raising it up out of operating position should it become desirable to do so. A turnbuckle 192 is inserted in the cable running to the clevis 187 at one side of the heat shield to allow for adjustment of the cable in order to maintain the shield in horizontal alignment. Wing nuts 193 threaded onto the elongated rods 185 are adapted to be adjusted so as to about against the upper surface of the cantilevered bars 186 and limit the downward movement of the heat shield as well as to carry the weight of the shield when in position.

The openings in the sidewalls 135 at the lehr cut-off 128 are closed at either side by sliding access doors 194 (FIGS. 16 and 17) suspended from rollers 195 adapted to run on an overhead track assembly 196 which is carried by the structural framework of the lehr.

I claim:

1. In a lehr for annealing glass in sheet form including a floor, a roof and opposite side walls defining a tunnel through which the sheet passes for gradual cooling, the improvement comprising cut-off means in the annealing lehr for venting said lehr to prevent the movement of air currents throughout the entire length thereof from the cooler end toward the warmer end, said lehr cut-off comprising means beneath the sheet for closing off the space between the sheet and the lehr floor including a spaced pair of lower screens extending transversely of the annealing lehr and forming a substantially closed chamber therebetween, means above the sheet for closing off the space between said sheet and the lehr roof including a curtain positioned above one of the pair of said lower screens and a heat shield positioned above the other of said lower screens, said lower screens, curtain and heat shield including tubular frame members, with means for circulating a heat absorbing medium through said tubular frame members and means operably associated with said tubular frame members for vertically adjustably suspending said lower screens, curtain and heat shield from above, an opening extending across the lehr roof between said curtain and said shield, and a flame heater extending transversely of the lehr within the substantially closed chamber beneath the sheet for heating said sheet to prevent excessive cooling thereof beneath the opening in the lehr roof, said flame heater comprising a manifold having a plurality of burner jets spaced thereacross.

2. In a lehr for annealing glass in sheet form including a floor, a roof, and opposite side walls defining a tunnel through which the glass sheet is conveyed upon a series of aligned rolls for gradual cooling, the improvement comprising a pair of screens beneath said sheet spaced from one another and extending transversely of said lehr for closing off the space between said sheet and lehr floor and forming a substantially closed chamber therebetween, a curtain positioned above one of said screens and a heat shield positioned above the other of said screens for substantially closing off the space between said sheet and the lehr roof, tubular frame members affixed to said screens, curtain and heat shield for supporting same, means for circulating a heat absorbing medium through said tubular frame members, and means defining an opening extending across the lehr roof between said curtain and said heat shield.

3. A lehr for annealing glass in sheet form as claimed in claim 2, including means operably associated with said tubular frame members for vertically adjustably positioning said screens, curtain and heat shield relative to said sheet.

4. A lehr for annealing glass in sheet form as claimed in claim 2, including means within said enclosed space between said sheet and lehr floor for heating said sheet to prevent excessive cooling thereof beneath said opening in said lehr roof.

References Cited
UNITED STATES PATENTS

| | | | |
|---|---|---|---|
| Re. 17,263 | 4/1929 | Mulholland | 65—118 |
| 1,513,544 | 10/1924 | Gelstharp | 65—95 |
| 1,547,797 | 7/1925 | Ewing | 65—194 X |
| 1,751,045 | 3/1930 | Mambourg | 65—345 |
| 1,818,231 | 8/1931 | Mambourg | 65—202 |
| 1,841,548 | 1/1932 | Nobbe | 65—196 X |
| 2,197,440 | 4/1940 | Shackelford | 65—118 |
| 2,725,679 | 12/1955 | Long | 65—118 |
| 2,766,555 | 10/1956 | Jendrisak et al. | 65—103 |
| 3,241,939 | 3/1966 | Michalik | 65—104 X |

S. LEON BASHORE, Primary Examiner

JOHN H. HARMAN, Assistant Examiner

U.S. Cl. X.R.

65—95, 196